(12) United States Patent
Davidson et al.

(10) Patent No.: US 12,358,237 B2
(45) Date of Patent: Jul. 15, 2025

(54) PREFORM CHARGES AND FIXTURES THEREFOR

(71) Applicant: Arris Composites Inc., Berkeley, CA (US)

(72) Inventors: Erick Davidson, Piedmont, CA (US); Ethan Escowitz, Berkeley, CA (US); Riley Reese, Oakland, CA (US); Sean Hennessee, San Francisco, CA (US); J. Scott Perkins, Oakland, CA (US)

(73) Assignee: Arris Composites Inc., Berkeley, CA (US)

( * ) Notice: Subject to any disclaimer, the term of this patent is extended or adjusted under 35 U.S.C. 154(b) by 0 days.

(21) Appl. No.: 17/694,419

(22) Filed: Mar. 14, 2022

(65) Prior Publication Data

US 2022/0203633 A1     Jun. 30, 2022

Related U.S. Application Data

(63) Continuation of application No. 16/600,131, filed on Oct. 11, 2019, now Pat. No. 12,226,961.

(60) Provisional application No. 62/744,822, filed on Oct. 12, 2018.

(51) Int. Cl.
| | |
|---|---|
| *B29C 70/46* | (2006.01) |
| *B29B 11/16* | (2006.01) |
| *B29C 65/00* | (2006.01) |
| *B29C 70/68* | (2006.01) |

(52) U.S. Cl.
CPC .......... *B29C 66/1122* (2013.01); *B29B 11/16* (2013.01); *B29C 70/46* (2013.01); *B29C 70/467* (2013.01); *B29C 70/68* (2013.01)

(58) Field of Classification Search
CPC .............................. B29C 70/467; B29C 70/54
See application file for complete search history.

(56) References Cited

U.S. PATENT DOCUMENTS

| | | | | |
|---|---|---|---|---|
| 2,414,125 | A * | 1/1947 | Rheinfrank, Jr. ..... | B29C 70/865 43/18.5 |
| 2,880,080 | A * | 3/1959 | Rankin ..................... | C08K 7/14 51/297 |
| 3,078,202 | A * | 2/1963 | Bellanca ................. | B29C 70/10 114/355 |
| 3,138,507 | A * | 6/1964 | Wiltshire ............... | B29D 22/00 156/218 |

(Continued)

FOREIGN PATENT DOCUMENTS

| | | |
|---|---|---|
| EP | 0313155 A1 | 4/1989 |
| WO | 2018/078501 A | 5/2018 |
| WO | 2020/236758 A1 | 11/2020 |

OTHER PUBLICATIONS

Final Rejection Mailed on Jan. 6, 2022 for U.S. Appl. No. 16/600,131.

(Continued)

*Primary Examiner* — Andrew D Graham
(74) *Attorney, Agent, or Firm* — Kaplan Breyer Schwarz, LLP

(57) ABSTRACT

A preform charge is formed by forming an assemblage of preforms, wherein preforms in the assemblage are bonded to a neighboring preform such that the preform charge effectively becomes a single unit. The preform charge can then be added to a mold to fabricate a part via compression molding.

23 Claims, 15 Drawing Sheets

(56) References Cited

U.S. PATENT DOCUMENTS

| | | | | |
|---|---|---|---|---|
| 3,150,032 A * | 9/1964 | Rubenstein | B29C 70/086 | 52/223.13 |
| 3,271,917 A * | 9/1966 | Rubenstein | B29C 70/12 | 52/309.17 |
| 3,641,230 A * | 2/1972 | Jenks | B29D 24/004 | 273/DIG. 7 |
| 3,655,321 A * | 4/1972 | Wolf | B29C 70/20 | 425/395 |
| 3,889,348 A * | 6/1975 | Lemelson | C22C 47/08 | 419/24 |
| 4,339,490 A * | 7/1982 | Yoshioka | B29C 70/12 | 428/297.4 |
| 4,340,562 A * | 7/1982 | Gross | B29C 45/0005 | 264/328.2 |
| 4,474,635 A * | 10/1984 | Adams | B60R 13/02 | 156/245 |
| 4,526,735 A * | 7/1985 | Norota | B29C 48/90 | 264/460 |
| 4,804,427 A * | 2/1989 | Paul | D04H 3/12 | 156/181 |
| 4,853,868 A * | 8/1989 | Medwin | B29C 70/54 | 425/141 |
| 4,935,279 A * | 6/1990 | Perko | G09F 7/00 | 40/616 |
| 5,066,536 A * | 11/1991 | Cogswell | B32B 5/26 | 428/401 |
| 5,076,601 A * | 12/1991 | Duplessis | B62K 19/16 | 280/281.1 |
| 5,080,385 A * | 1/1992 | Duplessis | B29C 70/86 | 280/281.1 |
| 5,094,883 A * | 3/1992 | Muzzy | B29B 15/12 | 427/195 |
| 5,152,856 A * | 10/1992 | Thein | B29C 70/865 | 264/321 |
| 5,198,281 A * | 3/1993 | Muzzy | D06M 23/08 | 156/308.2 |
| 5,294,461 A * | 3/1994 | Ishida | B29C 70/521 | 156/181 |
| 5,296,064 A * | 3/1994 | Muzzy | B29C 70/50 | 264/173.1 |
| 5,298,318 A * | 3/1994 | Soules | C08K 7/14 | 523/213 |
| 5,350,556 A * | 9/1994 | Abe | B29C 66/14 | 156/304.3 |
| 5,401,154 A * | 3/1995 | Sargent | B29B 7/603 | 264/108 |
| 5,405,683 A * | 4/1995 | Sandusky | B29C 70/34 | 428/105 |
| 5,503,887 A * | 4/1996 | Diaz | B29C 70/882 | 428/116 |
| 5,556,496 A * | 9/1996 | Sumerak | B29C 70/525 | 156/166 |
| 5,573,813 A * | 11/1996 | Custer | D06N 3/0086 | 427/370 |
| 5,597,629 A * | 1/1997 | Johnson | E04H 12/02 | 428/36.1 |
| 5,648,941 A * | 7/1997 | King | B06B 1/0681 | 367/176 |
| 5,667,881 A * | 9/1997 | Rasmussen | B29C 66/5344 | 156/308.2 |
| 5,753,164 A * | 5/1998 | Ritchie | B29C 43/34 | 264/108 |
| 5,888,608 A * | 3/1999 | Tsai | E04C 5/07 | 428/116 |
| 5,895,622 A * | 4/1999 | Ramani | D06M 15/705 | 118/712 |
| 5,989,710 A * | 11/1999 | Matsuo | D02G 3/402 | 156/196 |
| 6,331,028 B1 * | 12/2001 | O'Neill | B29C 70/086 | 428/71 |
| 7,243,055 B2 * | 7/2007 | Chen | B29C 70/54 | 703/2 |
| 7,846,366 B2 * | 12/2010 | Iobst | B29C 43/14 | 264/294 |
| 8,993,084 B2 * | 3/2015 | Griess | B32B 37/182 | 428/60 |
| 2002/0155251 A1 * | 10/2002 | Renault | B29C 43/48 | 264/258 |
| 2003/0001376 A1 * | 1/2003 | Verhaeghe | B29C 66/7392 | 280/781 |
| 2003/0054150 A1 * | 3/2003 | Evans | B32B 5/28 | 428/297.4 |
| 2003/0104738 A1 * | 6/2003 | Porter | B29C 66/721 | 156/92 |
| 2003/0155066 A1 * | 8/2003 | Roehr | B29C 70/467 | 156/245 |
| 2003/0168164 A1 | 9/2003 | Blackmore et al. | | |
| 2006/0073319 A1 * | 4/2006 | Roberson | B27N 3/002 | 428/292.1 |
| 2006/0172636 A1 * | 8/2006 | Bech | B29B 11/16 | 442/1 |
| 2006/0175731 A1 * | 8/2006 | Bech | B29C 66/731 | 264/259 |
| 2007/0020431 A1 * | 1/2007 | Nowacki | B29C 70/24 | 264/258 |
| 2007/0243368 A1 * | 10/2007 | Edwards | B32B 1/08 | 428/297.4 |
| 2008/0063864 A1 * | 3/2008 | Aisenbrey | B29B 9/14 | 428/364 |
| 2008/0099131 A1 * | 5/2008 | Umeda | B29C 66/9141 | 156/201 |
| 2008/0260954 A1 * | 10/2008 | Paton | C08J 5/042 | 442/189 |
| 2009/0169833 A1 * | 7/2009 | Koon | B32B 3/04 | 156/307.1 |
| 2010/0092770 A1 * | 4/2010 | Wadahara | B29B 11/16 | 156/278 |
| 2010/0121463 A1 * | 5/2010 | Tormala | A61L 27/58 | 623/23.75 |
| 2010/0136278 A1 * | 6/2010 | Cadd | B29C 66/1286 | 428/157 |
| 2010/0143145 A1 * | 6/2010 | Jones | B29C 66/723 | 428/114 |
| 2010/0178495 A1 * | 7/2010 | Taketa | B29C 70/305 | 83/13 |
| 2010/0196637 A1 * | 8/2010 | Lippert | F16C 7/026 | 428/36.1 |
| 2011/0136602 A1 * | 6/2011 | Hsu | A63B 60/00 | 473/535 |
| 2011/0156305 A1 * | 6/2011 | Lonsdorfer | B29C 70/546 | 264/261 |
| 2012/0046136 A1 * | 2/2012 | Allen | A63B 60/06 | 264/266 |
| 2012/0269999 A1 | 10/2012 | Kind et al. | | |
| 2012/0302118 A1 * | 11/2012 | Kasuya | B29C 70/465 | 525/240 |
| 2013/0065714 A1 * | 3/2013 | Avnery | A63B 60/50 | 473/561 |
| 2013/0082416 A1 * | 4/2013 | Wakeman | B29C 33/14 | 264/259 |
| 2013/0134621 A1 * | 5/2013 | Tsotsis | B29B 11/16 | 264/177.2 |
| 2013/0189482 A1 * | 7/2013 | Dequine | B29C 43/52 | 264/258 |
| 2013/0309465 A1 * | 11/2013 | Oda | B29C 65/5057 | 428/212 |
| 2013/0334734 A1 * | 12/2013 | Takahashi | B29C 70/467 | 264/257 |
| 2014/0003955 A1 * | 1/2014 | Richter | B29C 70/465 | 428/113 |
| 2014/0051310 A1 * | 2/2014 | Kunal | B29D 7/01 | 428/221 |
| 2014/0079908 A1 * | 3/2014 | Kato | B29C 65/02 | 428/140 |
| 2014/0178662 A1 * | 6/2014 | Luo | B32B 27/286 | 428/220 |
| 2014/0224410 A1 * | 8/2014 | Millar | F16B 39/22 | 156/92 |

(56) References Cited

U.S. PATENT DOCUMENTS

| | | | |
|---|---|---|---|
| 2014/0265043 A1* | 9/2014 | Oldroyd | B29C 53/828 425/162 |
| 2014/0272417 A1* | 9/2014 | Zeidan | B29C 48/05 428/407 |
| 2014/0319879 A1* | 10/2014 | Reese | B29D 23/00 156/149 |
| 2014/0323004 A1* | 10/2014 | Mihara | B60R 13/02 442/373 |
| 2014/0361460 A1* | 12/2014 | Mark | B29C 48/0022 264/248 |
| 2015/0017853 A1* | 1/2015 | Perillat-Collomb | B32B 5/028 428/221 |
| 2015/0044419 A1* | 2/2015 | Carson, Jr. | B29C 66/7392 428/138 |
| 2015/0151495 A1* | 6/2015 | Fisher, Jr. | B29C 43/52 264/328.16 |
| 2015/0239209 A1 | 8/2015 | Newton | |
| 2015/0298443 A1* | 10/2015 | Hundley | B32B 15/04 156/214 |
| 2015/0316027 A1* | 11/2015 | Sandercock | F03D 1/0675 29/889.71 |
| 2016/0114537 A1* | 4/2016 | Aubele | B32B 37/0053 156/173 |
| 2016/0136870 A1* | 5/2016 | Thienel | B60J 5/0416 428/300.7 |
| 2016/0339611 A1* | 11/2016 | Bartel | B29C 43/18 |
| 2016/0355651 A1* | 12/2016 | Inoue | B32B 5/022 |
| 2017/0103826 A1* | 4/2017 | Al-Harthi | C08J 5/18 |
| 2017/0120519 A1* | 5/2017 | Mark | B29C 64/106 |
| 2017/0173868 A1* | 6/2017 | Mark | B29C 64/393 |
| 2017/0182729 A1* | 6/2017 | Fox | B29C 45/0005 |
| 2017/0210035 A1* | 7/2017 | Fan | B29C 70/06 |
| 2017/0225383 A1* | 8/2017 | Taneda | B29C 70/384 |
| 2017/0232674 A1* | 8/2017 | Mark | B29C 31/042 264/308 |
| 2017/0254017 A1* | 9/2017 | Bertelo | C08K 7/04 |
| 2017/0320278 A1* | 11/2017 | Meeks | B29C 70/86 |
| 2017/0368812 A1* | 12/2017 | Palmieri | B29C 66/0242 |
| 2018/0030924 A1* | 2/2018 | Coppola | B29C 66/721 |
| 2018/0036970 A1* | 2/2018 | Chmielewski | B29C 70/86 |
| 2018/0186101 A1* | 7/2018 | Ikeda | B29C 70/086 |
| 2018/0222131 A1* | 8/2018 | Ducrot | B29C 70/12 |
| 2019/0160715 A1* | 5/2019 | Mitsunaga | B32B 37/10 |
| 2019/0177887 A1* | 6/2019 | Motohashi | B29B 11/00 |
| 2019/0210303 A1* | 7/2019 | Jones | B32B 5/28 |
| 2020/0114596 A1 | 4/2020 | Davidson et al. | |

OTHER PUBLICATIONS

Final Rejection Mailed on Jul. 31, 2020 for U.S. Appl. No. 16/600,131.
Lennart Wedhorn et al., "Quilted Stratum Process for High-performance CFRP Production", Lightweight Design Worldwide, Mar. 1, 2017, pp. 50-55, vol. 10, No. 1.
Non-Final Rejection Mailed on Jun. 24, 2021 for U.S. Appl. No. 16/600,131.
Advisory Action (PTOL-303) Mailed on Apr. 13, 2022 for U.S. Appl. No. 16/600,131.
Examiner Interview Summary Record (PTOL-413) Mailed on Apr. 13, 2022 for U.S. Appl. No. 16/600,131.
International Search Report mailed Jan. 20, 2020 issued in related PCT Application No. PCT/US2019/055951.
Non-Final Office Action received for U.S. Appl. No. 16/600,131, mailed on Jan. 24, 2020.
Non-Final Rejection Mailed on Jan. 24, 2020 for U.S. Appl. No. 16/600,131.
1 Non-Final Rejection Mailed on May 26, 2022 for U.S. Appl. No. 16/600,131.
Final Rejection Mailed on Sep. 22, 2022 for U.S. Appl. No. 16/600,131.
Office Action issued in European patent application No. 19795423.3, Feb. 21, 2023, 7 pp.

* cited by examiner

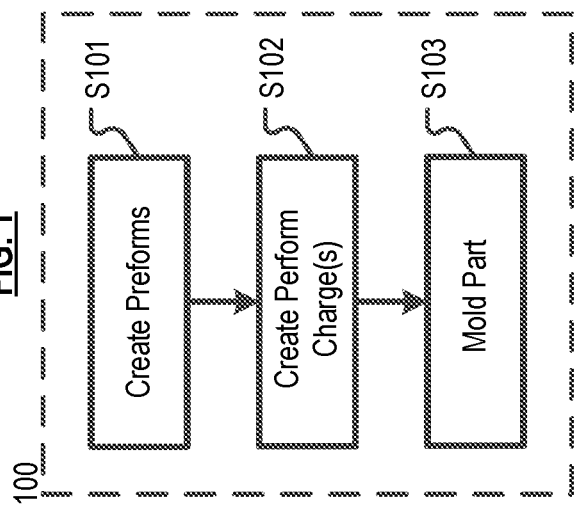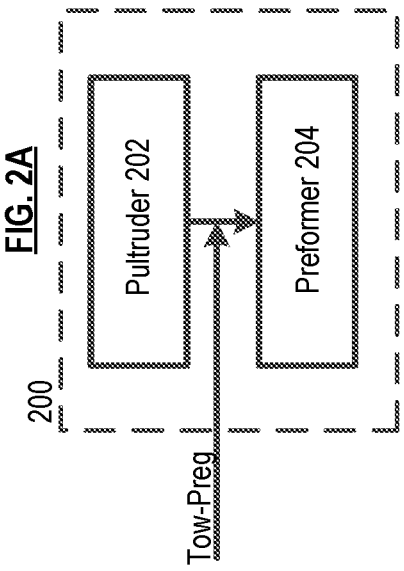

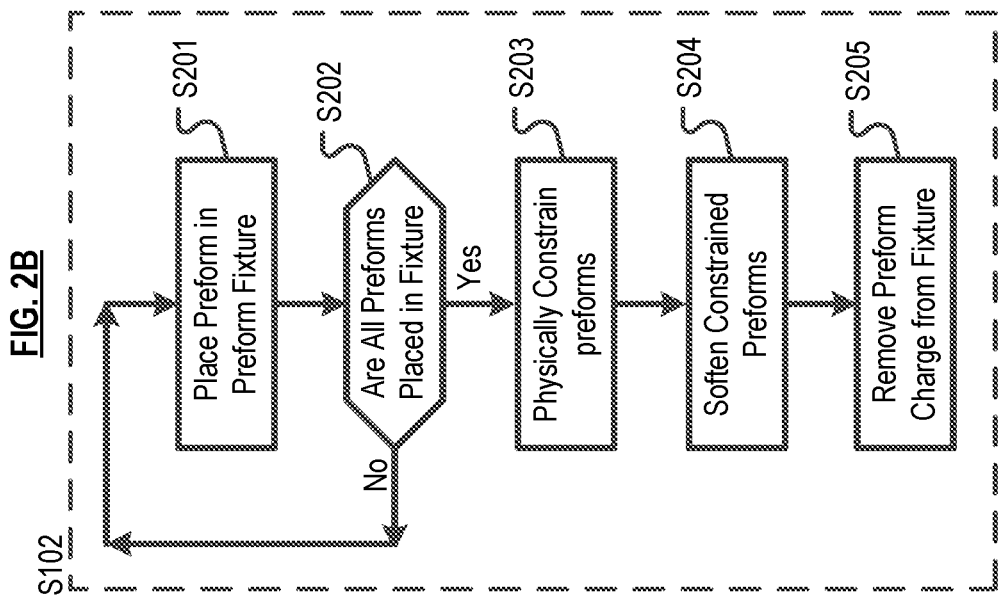

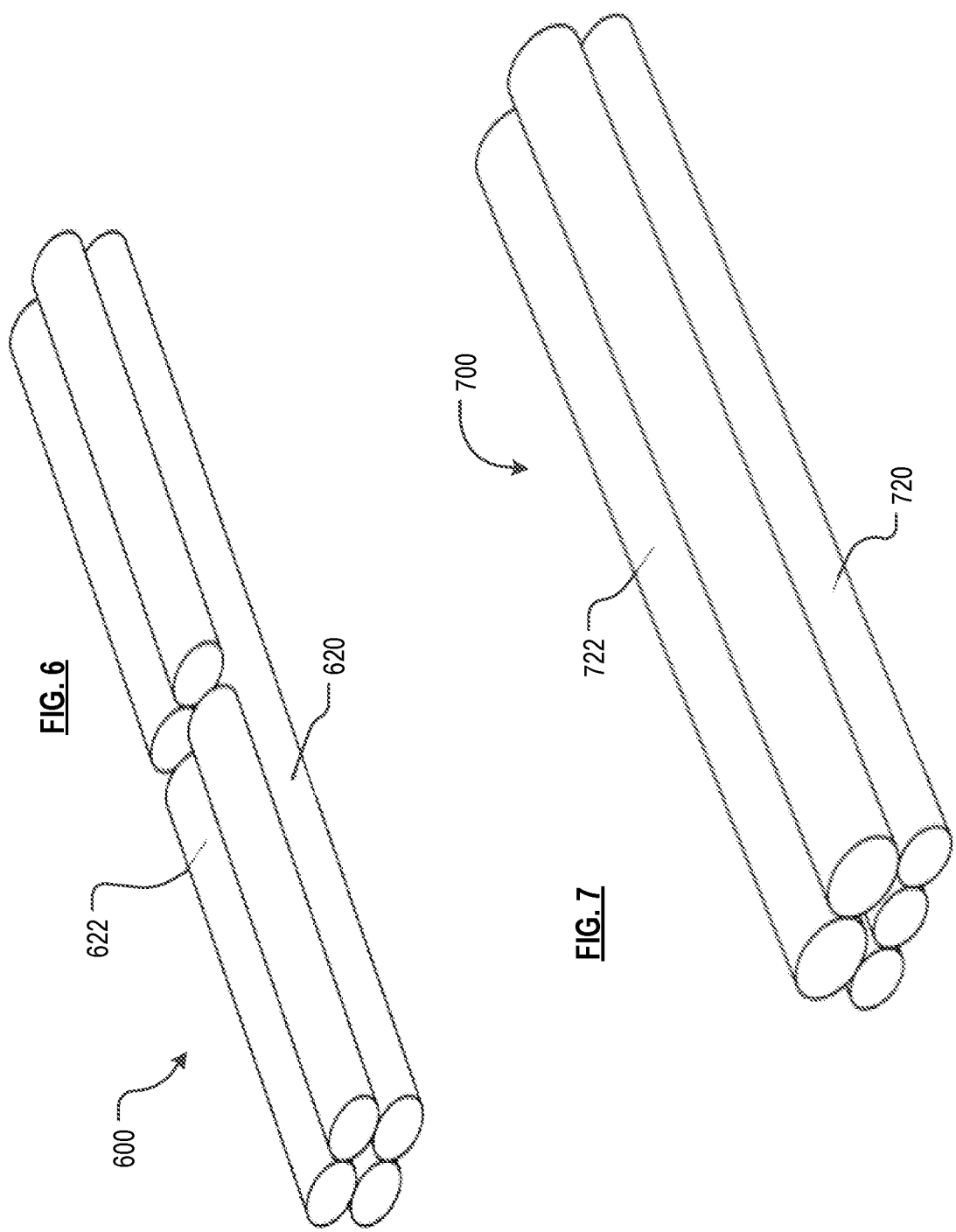

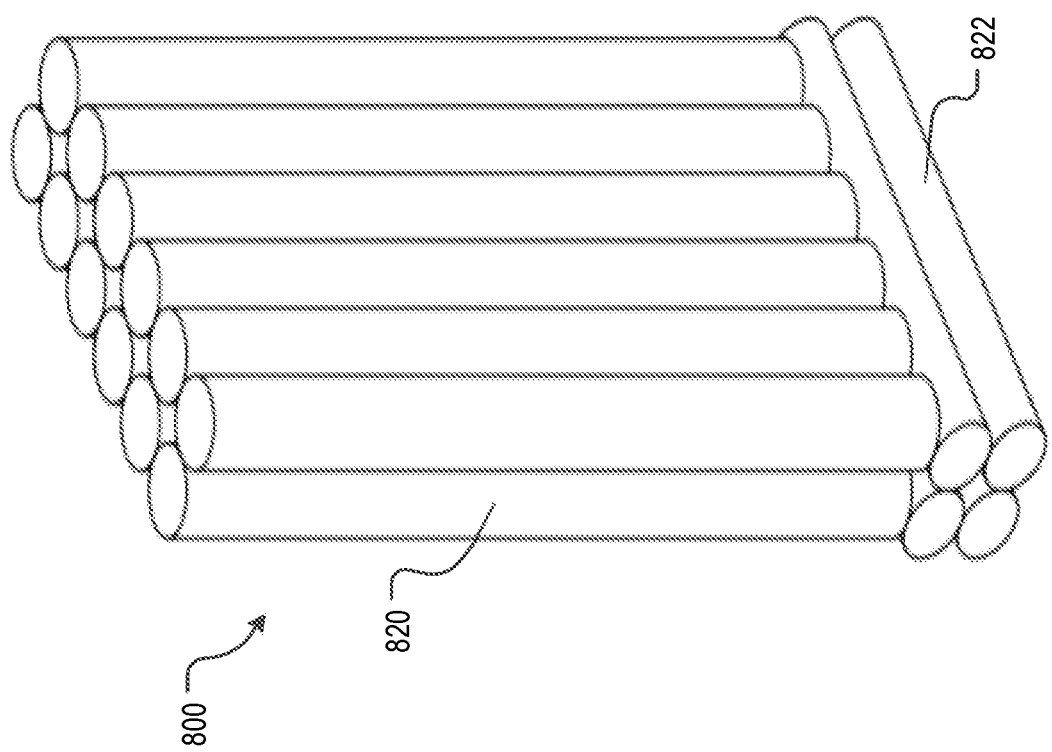

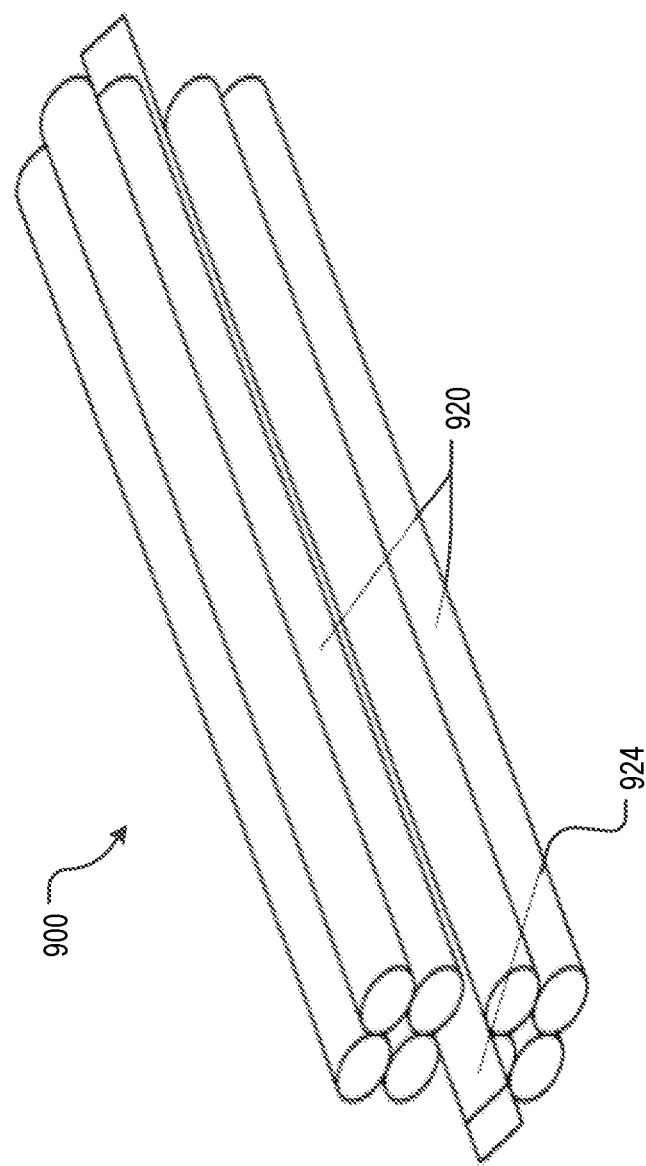

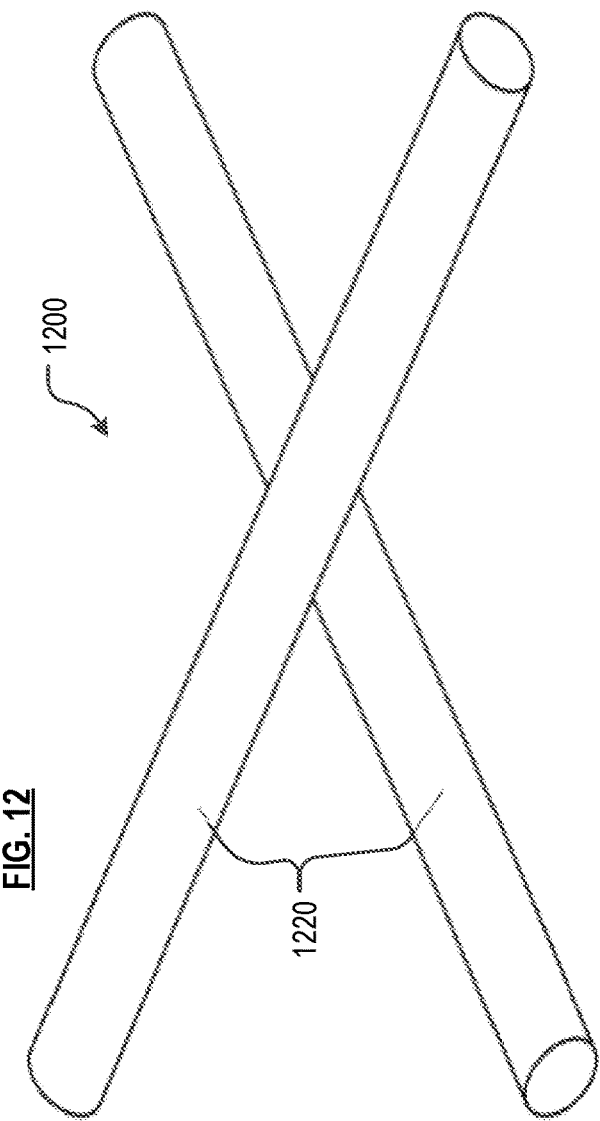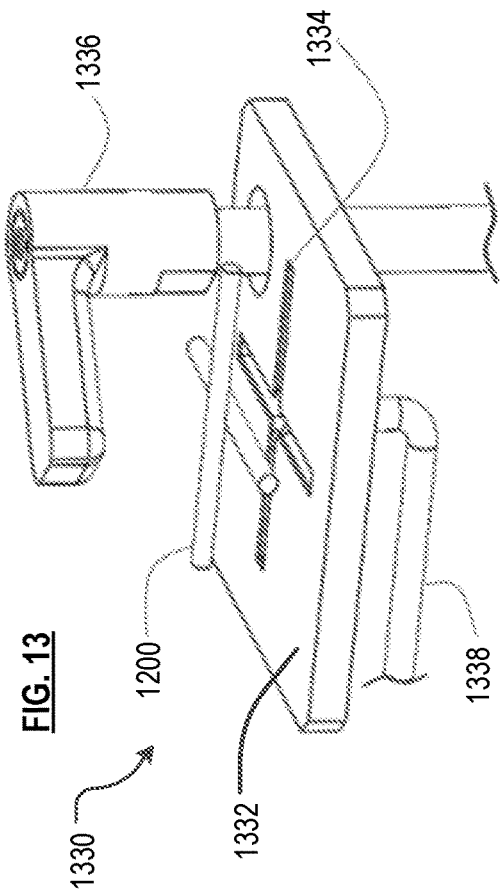

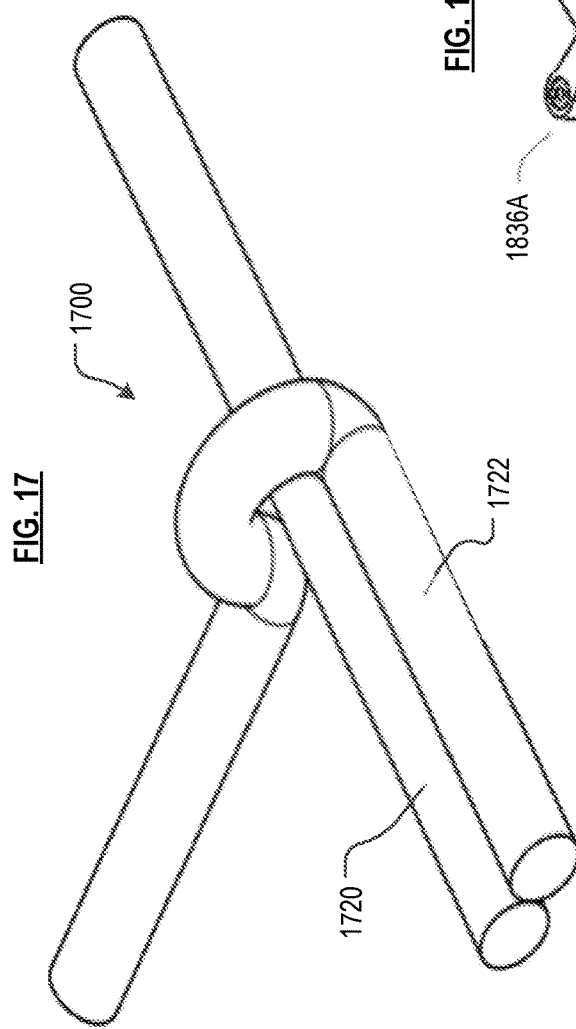
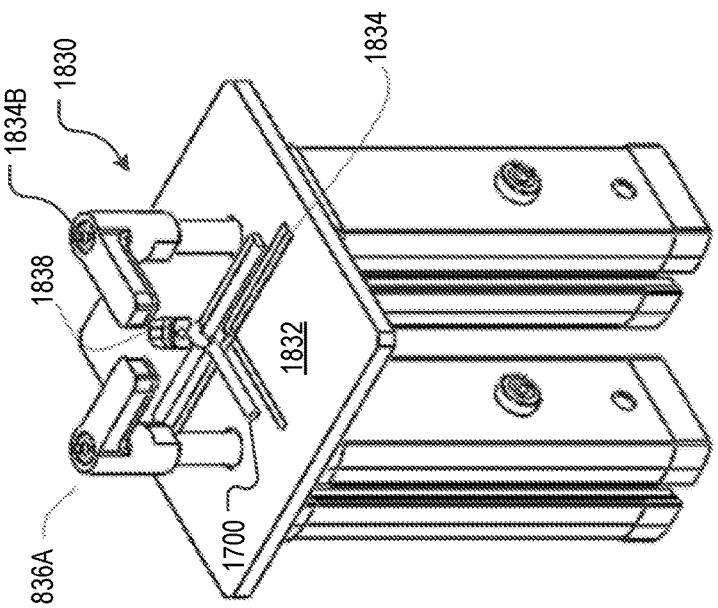

PREFORM CHARGES AND FIXTURES THEREFOR

STATEMENT OF RELATED CASES

This case is a continuation of and claims priority of U.S. patent application Ser. No. 16/300,131 filed Oct. 11, 2019, which is incorporated by reference and claims priority of U.S. Pat. App. Ser. 62/744,822 filed Oct. 12, 2018, which is incorporated by reference herein.

FIELD OF THE INVENTION

The present invention relates to the manufacture of fiber-composite parts.

BACKGROUND

There is a demand for high-volume, low-cost components ("parts") that are made of fiber-composite materials, due to the superior material attributes (e.g., high strength, high stiffness, low mass, etc.) thereof.

Fiber composites include two primary components: a matrix material and a fibrous material. The fibrous material—fibers—are typically responsible for the strength of the composite, in addition to any other properties they contribute. The matrix, formed from a polymer resin, surrounds and supports the fibers, maintaining their relative positions and preventing abrasion and environmental attack thereof. The combination of the fibers and resin is synergistic, with the resulting properties depending on the specific fiber, resin, and fiber volume fraction.

The alignment of fibers within composites along directions of principal stress is an important consideration in deriving the maximum performance for a composite part. Current methods for manufacturing composite parts, especially in large quantities, are ill-suited for producing parts with aligned fibers. That is the case for all molding processes, including, for example, compression molding.

In the context of compression molding, one approach for filling the female mold involves lay-up of sheets of material. In a traditional lay-up process, multiple sheets of sized, unidirectional or bidirectional fabric (i.e., a weave) are placed on one on top of another in the mold. The sheets can be rotated relative to one another, such that sheets are oriented at, for example, 0°, +30°, −30°, etc. In another lay-up technique for compression molding, sheets of unidirectional or bidirectional fiber material are cut to an appropriate size and shape (e.g, a circle, semi-circle, rectangle, etc.), creating "preforms," which are then placed in a compression mold. Since it is not possible to align fibers independently of one another within a sheet of material (fiber alignment in a sheet is fixed), these two methods at best provide a very limited ability to obtain a desired fiber alignment. This is particularly true with respect to discrete regions of a part. Furthermore, such lay-up techniques are very labor intensive and therefore quite costly.

In yet another technique, a length of unidirectional tape, functioning as a local stiffener, is placed in a mold along with chopped fiber (which necessarily has a completely random orientation). This technique can provide additional strength in a particular region of the part.

The art would therefore benefit from a way to efficiently and cost effectively produce high-volume, fiber-composite parts wherein the fibers can be reliably aligned in a mold with much greater freedom than in the prior art for best part performance.

SUMMARY

The present invention provides a way to speed the production of high-volume, fiber-composite parts having fibers aligned, as desired, to an extent not possible in the prior art.

Applicant has been developing improvements to the compression molding process, among other molding processes. In accordance with an embodiment of the invention, constituent elements are placed in mold that produces a part via a compression-molding process. In some embodiments, the constituent elements are preforms, in some other embodiments, the constituent elements are preform charges, and in some further embodiments, the constituent elements are both preforms and preform charges.

A preform is a sized, or sized and shaped fiber bundle impregnated with resin. In the illustrative embodiment, the fiber bundle contains thousands of fibers, and is typically referred to as "tow." In embodiments in which the fiber feedstock is tow, then the fibers in the fiber bundle must be impregnated with resin, such as via a pultrusion process. In some other embodiments, the fiber feedstock has already been impregnated with resin; such a material is typically referred to as "towpreg" or "prepreg tow." For simplicity, the resin impregnated fiber bundle, however produced, is referred to herein as "towpreg."

Thus, towpreg is sized (cut) so that it can fit into the mold. In some embodiments, sized towpreg is also bent into a desired shape, such as to fit a contour of the mold, or position the fibers of the sized towpreg in certain discrete regions of the mold. Again, such sized, or sized and shaped towpreg is referred to herein a preform. As used herein, the term "preform" does not refer to sized, or sized and shaped tape, sheets, or laminates.

Adding preforms, one-by-one, to a mold provides an ability to tailor, with great specificity, fiber alignment within a mold. Despite the flexibility in fiber alignment offered by the use of preforms, there are some drawbacks associated with such a technique. Consider that the bending machine that creates the preforms is likely to be some significant distance from the location of the mold. Thus, placing individual preforms in the mold until the requisite amount thereof have been added requires repeated trips from the bending machine to the mold. This is a time-consuming process. Furthermore, after placement in a mold, individual preforms may move out of their desired position/alignment. And once the mold is closed, it is typically not possible to determine if such movement has occurred.

In accordance with some embodiments, a "preform charge" is formed by tacking together plural preforms, wherein the preform charge effectively becomes a single unit. In embodiments in which the resin used (in the towpreg) is a thermoplastic, the preforms are tacked together by abutting them to one another (under minimal pressure) and heating them until they soften, followed by cooling. The temperature to which the bundles are heated is a function of the resin being used; it is within the capabilities of those skilled in the art to select a temperature for tacking as a function of resin type. Pre-cured thermosets, on the other hand, are tacky without heating. Thus, in cases in which the resin is a thermoset, fiber bundles can be pressed together with enough force to cause them to stick to one another.

The preform charge can be assembled at or near the bending machine, or at an intermediate location between the bending machine and the mold.

In some embodiments, a preform charge can include, in addition to preforms (i.e., sized or sized and shaped towpreg), fiber in other form factors, such as tape, sheets or laminate. In some embodiments, a preform charge can include non-fiber inserts that are not intended to remain in a part being fabricated, such as to create through-holes in the preform charge. In yet some further embodiments, a preform charge can include inserts that are intended to remain in the part being fabricated, and can include threaded inserts, metal rods and active components, such as, without limitation, mechanical, electrical, optical, and piezoelectric components, and the like.

The properties of a fiber-composite part are a function of, among any other parameters, the type, geometry, and relative orientation of its constituent materials. Creating preforms or preform charges in accordance with the present invention provides an ability to manipulate the constituent molding materials in a manner that is very accurate, such as by creating a desired fiber alignment in discrete regions of a part, thereby improving the ability to provide molded parts with desired performance characteristics.

Since, in the illustrative embodiment, the preform charge is assembled outside of a mold, it can be readily inspected, such as to ensure proper alignment of the constituent preforms with respect to one another. Furthermore, the preform charge can be sized and shaped to match mold features so that it is necessarily situated and remains in a single, desired position, wherein all fibers in the preform charge are ideally aligned. That is, the preform charge can be naturally "registered" in the mold and held in place therein by virtue of its shape and size. As previously noted, neither such inspection nor registration can be performed for prior-art processes.

Additionally, forming a preform charge at the bending machine, or at an intermediate location between the bending machine and the mold, improves the overall efficiency of the molding process since far fewer trips are required (between the bending machine and the mold) to fill the mold.

It is routine to match the weight of the constituents added to a mold to the desired weight of the final part. To the extent that weight needs to be added/subtracted to meet a target, doing so has been relatively time consuming. In the prior art, such weight adjustment is performed by cutting length from already made sheet-based preforms or adding custom sheet-based preforms to provide additional weight. Due to the variability in preform weight, this requires weighing all of the individual sheet-based preforms before they are placed in the mold. When using a preform charge in accordance with the invention, the weighing process can be automated, and resin or towpreg can be added as necessary to achieve the desired weight. This also represents a time savings over the prior art.

In some embodiments, a preform charge is created using a preform-charge fixture. The fixture enables an accurate and repeatable assembly of preforms, thereby resulting in a preform charge that can then be transferred to a compression molding process. In some embodiments, additional constituents are used in conjunction with the preforms, such as tape, conductive material, etc., to form the preform charge.

The preform-charge fixture is capable of locating and constraining the preforms and any additional constituents in a preferred orientation relative to each other. These constituents are then joined together. In some embodiments, the preform-charge fixture itself is capable of joining the constituents, such as via a heat/energy source and/or an arrangement for compressing the constituents against one another. In some other embodiments, a complementary process, rather than the preform-charge fixture itself, performs the joining/tacking operation. After the preform charge is formed, it is removed from the preform-charge fixture and placed in a mold and then, under the action of heat and pressure (i.e., compression molding), forms a part.

In some embodiments, the preform-charge fixture includes a plate, an appropriately shaped cavity formed in the plate, clamps, and an energy source. The shape of the cavity situates the constituents (e.g., performs, etc.) in a desired orientation. Clamps are used, as necessary, to fix the constituents in place and, in some embodiments, to apply some amount of pressure to force the constituents together. The heat/energy source is then used to join the constituents to one another. Preforms can be placed in the cavity by hand or via a robot. In this embodiment, the preform-charge fixture is somewhat analogous to a "mold."

In some other embodiments, rather than including a cavity, a plate includes a plurality of cleats, which are used to guide and position the constituents of the preform charge into a proper location/orientation. The one or more clamps are then used to fix the constituents in place. The heat/energy source is then used to join the constituents to one another. In this embodiment, the preform-charge fixture is somewhat analogous to a mandrel, wherein the constituents are "wound" around a supporting surface(s).

Important variables of the preform-charge fixture include the geometry of the cavity or the geometry defined by the arrangement of cleats (and location of cleats relative to the clamps), along with the heat/energy source used for joining the constituents. The preform-charge fixture operates in a repeatable, fast, and, in some embodiments, semi- or fully automated manner.

In some embodiments, the present invention provides a method comprising: placing a requisite amount of preforms in a preform-charge fixture, each preform consisting essentially of a fiber bundle and resin, wherein the preform-charge fixture creates an assemblage of the preforms, the assemblage having first geometry defined by the preform-charge fixture;

physically confining, restraining, or applying pressure to the preforms so that the preforms in the assemblage thereof abut one another; and softening the preforms when the polymer bundle comprises thermoplastic, thereby causing at least some neighboring preforms in the assemblage to bond to one another to form a preform charge.

In some further embodiments, the present invention provides a method comprising the steps of placing preforms in a fixture, physically confining them, and softening them, as described above, and further comprising:

placing the preform charge into a mold cavity;
closing the mold cavity; and
subjecting the preform charge to elevated temperature and pressure in accordance with compression-molding operational protocols, thereby fabricating a fiber-reinforced composite part.

In some additional embodiments, the present invention provides a method comprising the steps of placing preforms in a fixture, physically confining them, and softening them, as described above, and further comprising:

weighing the preform charge; and
when additional weight is required, adding resin or a portion of towpreg to the preform charge, wherein the towpreg has a diameter or length that is less than the diameter of the towpreg used to create each preform.

In yet some other embodiments, the present invention provides a method comprising the steps of placing preforms in a fixture, physically confining them, and softening them, placing the preform charge in a mold cavity, closing the mold, and molding at elevated temperature and pressure, as described above, and further comprising:

inspecting the preform charge via a non-destructive testing method prior to adding the preform charge to the mold cavity.

In some further embodiments, the present invention provides a preform charge, wherein the preform charge comprises an assemblage of preforms, the assemblage having a first geometry, each preform in the assemblage consisting essentially of towpreg, the towpreg including a plurality of fibers and a polymer resin, wherein a sufficient number of preforms in the assemblage are bonded together to ensure that all preforms in the assemblage remain bound thereto.

BRIEF DESCRIPTION OF THE DRAWINGS

FIG. 1 depicts a method for making a part via a compression molding process using a preform charge in accordance with an illustrative embodiment of the invention.

FIG. 2A depicts a system for making a preform for use in the method of FIG. 1.

FIG. 2B depicts a method for making a preform charge in accordance with the present teachings, for use in the method of FIG. 1.

FIG. 3 depicts sub-operations for use in molding a part in the method of FIG. 1.

FIG. 6 depicts an embodiment of a preform charge, wherein fiber bundles have different lengths.

FIG. 7 depicts an embodiment of a preform charge, wherein fiber bundles have different diameters.

FIG. 8 depicts an embodiment of a preform charge, wherein the fiber bundles have a different length and a different alignment.

FIG. 9 depicts an embodiment of a preform charge, wherein an insert is included with the fiber bundles.

FIG. 12 depicts an embodiment of a preform charge, wherein the fiber bundles are not axially aligned.

FIG. 13 depicts an embodiment of a preform-charge fixture suitable for forming the preform charge of FIG. 12.

FIG. 17 depicts an embodiment of a preform charge including an interlocking fiber bundle.

FIG. 18 depicts an embodiment of a preform-charge fixture suitable for forming the preform charge of FIG. 17.

DETAILED DESCRIPTION

Definitions

Figure 4:
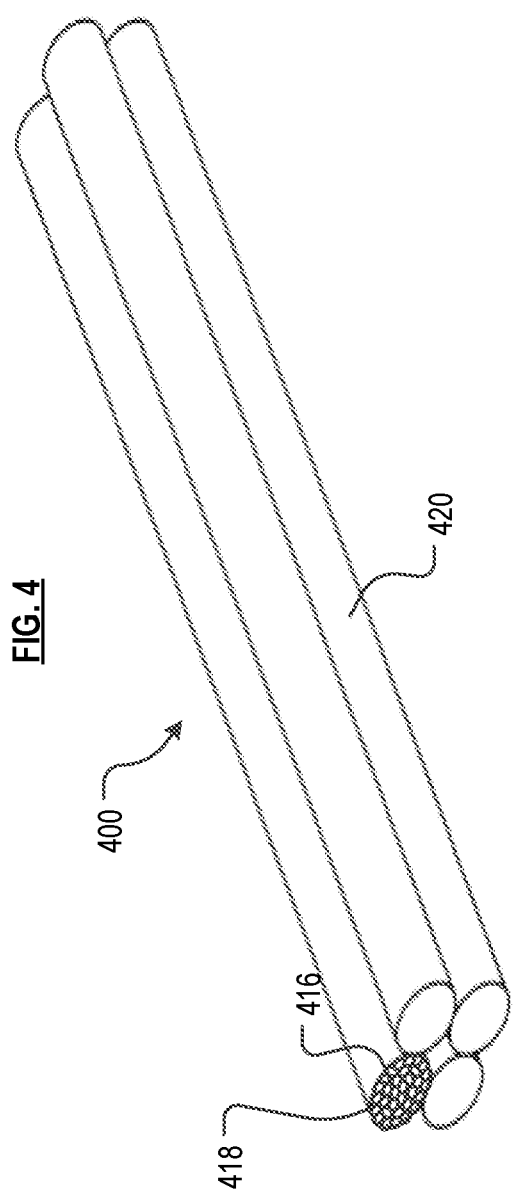
FIG. 4 depicts an embodiment of a preform charge, wherein all fiber bundles within the charge are the same length and linear.

The following terms are defined for use in this description and the appended claims:

"Fiber" means an individual strand of material. A fiber has a length that is much greater than its diameter. For use herein, fibers are classified as (i) continuous or (ii) short. Continuous fibers have a length that is about equal to to the length of a major feature of a mold in which they are placed. And, similarly, continuous fibers have a length that is about equal to that of the part in which they will reside. Short fibers have a length that is shorter than the length of a major feature of the mold in which they are placed, and typically comparable to the length of minor features of the mold. The term "short fiber," as used herein, is distinct from the "chopped fiber" or "cut fiber," as those terms are typically used in the art. In the context of the present disclosure, short fiber is present in a preform and, as such, will have a defined orientation in the preform, the mold, and the final part. As used generally in the art, chopped or cut fiber has a random orientation in a mold and the final part. Additionally, as used herein, the length of "short fiber" will be based on the length of the smaller features of a mold (they will be comparable in length). In contrast, the length of chopped or cut fiber typically bears no predefined relationship to the length of any feature of a mold/part.

"Continuous" fiber or fiber bundles have a length that is about equal to the length of a major feature of a mold in which they are placed (and the final part).

"Short" fiber or fiber bundles have a length that is shorter than the length of a major feature of the mold in which they are placed, and typically comparable to the length of minor features of the mold.

"Tow" means a bundle of fibers (i.e., fiber bundle), and those terms are used interchangeably herein unless otherwise specified. Tows are typically available with fibers numbering in the thousands: a 1K tow, 4K tow, 8K tow, etc.

"Prepreg" means fibers that are impregnated with resin.

"Towpreg" means a fiber bundle (i.e., a tow) that is impregnated with resin.

"Preform" means a sized, or sized and shaped portion of towpreg, wherein the cross section of the towpreg has an aspect ratio (width:thickness) of between about 0.25 to about 6. The term preform explicitly excludes sized/shaped (i) tape (which typically has an aspect ratio— cross section, as above—of between about 10 to about 30), (ii) sheets of fiber, and (iii) laminates.

"Preform Charge" means an assemblage of preforms that are at least loosely bound together so as to maintain their position relative to one another. Preform charges can contain fiber in form factors other than that of fiber bundles, and can contain various inserts, passive or active.

"About" or "Substantially" means +/−20% with respect to a stated figure or nominal value.

Other than in the examples, or where otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−15%.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

The towpreg that is sized or sized and shaped to form preforms for use herein includes thousands of individual fibers, typically in multiples of a thousand (e.g., 1k, 10k, 24k, etc.). Although all of the preforms depicted in the Figures are cylindrical (i.e., have a circular cross section), they can have any suitable cross-sectional shape (e.g., oval, trilobal, polygonal, etc.).

The individual fibers in the towpreg/preforms can have any diameter, which is typically, but not necessarily, in a range of 1 to 100 microns. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), aluminasilicate, calcium silicate, rock wool, boron nitride, silicon carbide, and combinations of any of the foregoing. Furthermore, carbon nanotubes can be used.

Any resin—thermoplastic or thermoset—that bonds to itself under heat and/or pressure can be used. Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC). An exemplary thermoset is epoxy.

A preform charge, as disclosed herein, can consist of as few as two preforms or include as many as are required for a particular part. A single preform charge can comprise preforms that have fibers and/or resins that are different from one another. It is preferable to have the resin be the same through all preforms in a preform charge, but this is not necessary as long as the different resins are "compatible;" that is, as long as they bond to one another. A preform charge can also include inserts that are not fiber based.

Preforms, Preform Charge, and Part Fabrication

FIG. 1 depicts a block diagram of method 100 for creating a molded part using a preform charge, in accordance with the illustrative embodiment of the invention. In accordance with operation S101 of method 100, a preform is created.

FIG. 2A depicts system 200 for creating a preform, as per operation S101.

System 200 includes pultruder 202 and preformer 204. The pultrusion process is used to create a fiber bundle that is impregnated with resin (i.e., towpreg). This process, as performed by a pultruder, is well known in the art (wikipedia.org/wiki/Pultrusion). The feed to pultruder 204 is, for example, pelletized resin and raw fiber (usually provided on spools). If towpreg is available as a feedstock, then the pultruder can be bypassed.

The towpreg, however obtained, is fed to preformer 204. The preformer comprises one or more devices that are capable of cutting the resin-infused fiber bundle to a size appropriate for use in a specific mold, and, as desired, for bending or otherwise shaping the sized segment of fiber bundle.

Returning now to FIG. 1, after a plurality of preforms are created per operation S101, they are used to create a preform charge, per operation S102. FIG. 2B depicts a block flow diagram of a method for creating a preform charge.

A preform charge is formed from plural preforms, and is typically created using a preform-charge fixture. The preform-charge fixture, examples of which are depicted in FIGS. 11, 13, 16, and 18 and described later in this specification, is designed to create a preform charge having a specified geometry and size. A number of different preform charges all having a simple geometry with common features may be formed using a single preform-charge fixture. This is the case, for example, for preform charges 400 through 1000 depicted in respective FIGS. 4 through 10, which can all be formed via preform-charge fixture 1140 of FIG. 11. However, as the geometry of a preform charge increases in complexity, such common features are less likely and each such preform charge will then typically require a dedicated preform-charge fixture. It is within the capabilities of those skilled in the art to design, build, and operate a preform-charge fixture to fabricate a preform charge having a specified geometry.

With reference to FIG. 2B, and in accordance with operation S201, a preform is placed in a preform-charge fixture. Query, at operation S202, whether all required preforms have been placed in the fixture. If "no," another preform is added to the preform-charge fixture. This process can performed robotically, wherein after a preform is created per operation S101, it is moved, such as via a pick-and-place robot, into/onto the preform-charge fixture. Once the requisite number of preforms have been added to the preform-charge fixture (i.e., "yes" to the query), or as each preform is added, the preform(s) are physically constrained per operation S203, such as by clamps.

In embodiments in which the towpreg includes a thermoplastic resin, the constrained preforms are softened, in accordance with operation S204, such as via the application of heat, energy, etc. In various embodiments, the heat to bond individual preforms to each other is provided by a hot plate, a hot implement such as soldering iron, or hot air. Additionally, other methods can be used to bond individual preforms, particularly in situations in which the preforms do not readily bond to one other. Such other methods include, without limitation, ultrasonic welding, friction welding, lasers, heat lamps, chemical adhesives, and mechanical methods such as lashing.

The temperature at which the preforms will soften is a function of the particular thermoplastic resin used. It is within the capabilities of those skilled in the art to determine the temperature at which any given thermoplastic resin will soften. Typically, this temperature is greater than or equal to the heat deflection temperature of the particular thermoplastic. For example, for PA6 (nylon 6), the heat deflection temperature is about 320° F., and this is the temperature at which a PA6-based preform will soften. The force to bond the heated preforms can be gravity (for thermoplastics). For thermosets, or if more force is necessary for thermoplastics, force can be supplied by the end effector on a pick-and-place robot, or clamps. However constrained, the preforms abut one another, and they join/tack to one another (for thermoplastics, the tacking is complete with the removal of heat). This organized assemblage of preforms defines a preform charge.

The station at which preform charges are formed can include a scale to weigh the preform charges and adjust weight, as necessary. In some embodiments, frequency-based non-destructive methods are used to detect fiber breakages, fiber misalignment, cracks, and voids before transferring the preform charge to the mold.

In operation S205, the preform charge is removed from the fixture, such as via a pick-and-place robot.

It is notable that in some embodiments of the invention, the preform charges are assembled via a preform-charge fixture at a location proximal to where the preforms are created. In some other embodiments, the preform charges are formed at a location that is intermediate between the location of preform creation and the mold.

In some embodiments, the preform charge consists of a single, continuous length of prepreg. This may be implemented, for example, via 3D-printing. Using a 3D-printed preform charge may dispense with the need for a separate tacking/bonding operation.

Dimensional accuracy of the preform charge can be important in certain situations. Preform charges can be machined or laser ablated to achieve a predetermined tolerance or to create certain features to mate with other preform charges, preforms, the mold cavity, or the pick-and-place gripper of a robot.

Referring again to method 100 of FIG. 1, after forming one or more preform charges, a part is molded per operation S103. FIG. 3 depicts an embodiment of sub-operations for molding a part.

In accordance with sub-operation S301, one or more preforms, or one or more preform charges, or one or more of both preforms and preform charges, are placed in a mold cavity. In some embodiments, the preform charge may be transferred by a pick-and-place robot directly from the preform-charge fixture to the mold cavity. In some other embodiments, after the preform charge is created, it is robotically transferred to an intermediate holding tray. In such embodiments, the preform charge(s) are transferred from the holding tray to the mold cavity.

The preforms and preform charges are sized and shaped for the geometry of the mold cavity and, typically, to achieve a certain fiber orientation in discrete regions of the part, such as to meet certain performance specifications. The amount of preforms/preform charges to be added to the mold cavity is based on the anticipated weight of the part being molded, as calculated based on part volume and the density of the molding material (i.e., preforms/preform charges).

Once the requisite amount of preforms and/or preform charges are added to the mold cavity, the mold is closed, per sub-operation S302. In accordance with well known compression molding protocols, heat and pressure is applied and the part is molded. [own] In some embodiments, an intermediate cavity is used where all preform charges are placed and then consolidated at once by heating the cavity. The intermediate cavity readily disassembles, or the consolidated charge is readily removed, to expose the consolidate preform charge for inspection before it is transferred to a mold cavity.

Exemplary Preform Charges and Fixtures

FIGS. 4-10, 12, 14-15, 17, 19, and 20 depict embodiments of preform charges, each having different architectures. It is to be understood that the number of preforms shown in any particular figure is strictly for illustrative purposes, and that the various architectures of the preform charges are not restricted to any particular number of preforms. That number is dictated, rather, by the size of the mold, among any other considerations.

FIG. 4 depicts preform charge 400 comprising plural—in this embodiment four—preforms 420 that are joined together. Each preform 420 is an appropriately sized segment of towpreg having plural fibers 416 impregnated with resin 418. In this embodiment, each preform 420 in preform charge 400 has the same length, diameter, and orientation.

Figure 5:
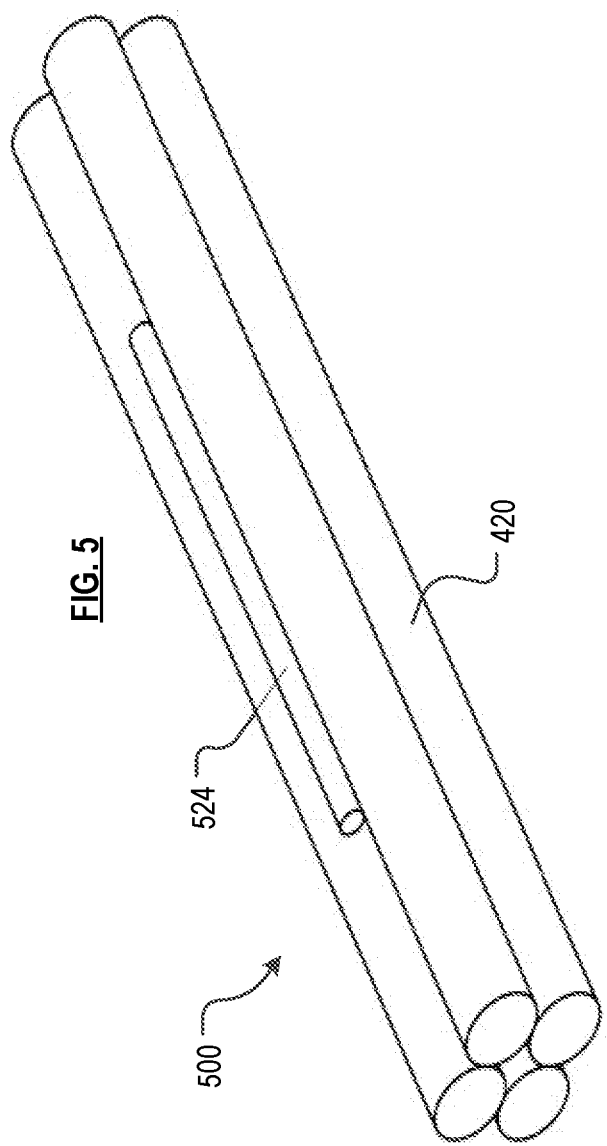
FIG. 5 depicts an embodiment of a preform charge, wherein the preform charge includes a weight adjustment.

FIG. 5 depicts preform charge 500, which comprises preform charge 400 of FIG. 4 with weight-adjustment feature 524. It is useful in molding to match the preform weight to the desired weight of the final part, or to sometimes use a predetermined higher weight for overfilling of the mold cavity. Due to the variability in towpreg composition and accuracy in cutting and bending preforms, it is difficult to match weight within a desired tolerance zone by simply counting preforms. In such cases, it is common, in the prior art, to weigh the preforms and then add or subtract weight as necessary by either cutting existing preforms or using custom-cut additional preforms.

In some embodiments, the preform charge is designed to always be no greater than the desired weight. After or during assembly, the preform charge is weighed and, as necessary, weight is added. Weight is added via a nozzle that dispenses a bead of the resin material, or, alternatively, via a separate machine that cuts a requisite amount of towpreg that is smaller in diameter than the preforms of the preform charge and/or has a different length that the preforms in the preform charge, such as weight adjustment towpreg 524. Weight can be subtracted from the preform charge, by, for example, machining or laser ablating.

In some other embodiments, the fiber volume fraction or weight fraction could be measured and adjusted by adding or subtracting (such as via laser ablation) resin from the preform charge. Fiber volume fraction can be measured by various non-destructive methods such as ultrasonic, acoustic, or radiographic.

FIG. 6 depicts preform charge 600 having preforms of different lengths, including relatively longer preforms 620 and relatively shorter preforms 622. This type of preform charge is especially useful for parts having some smaller features, wherein accordance with the method disclosed in applicant's co-pending application Ser. No. 16/509,801, the shorter fibers (from shorter-length preforms) are flowed into the smaller features, and the relatively longer fibers (from longer-length preforms) do not flow, but rather remain in the main portion of a mold cavity.

FIG. 7 depicts preform charge 700 comprising a first group of preforms having a relatively smaller diameter and a second group of preforms having a relatively larger diameter. In some embodiments, the preforms in the two groups comprise identical material; they simply have a different diameter. This is useful for filling molds or cavities of specific shapes. In addition to including preforms having different diameters in a preform charge, preforms having different cross-sectional shapes can be used to more efficiently fill mold cavities of a specific shape. In some alternative embodiments, the preforms in each group can be made of different materials. For example, in some embodiments, one of the groups comprises carbon fiber and the other group comprises glass fiber, both having the same resin. Preform 700 can have more than two groups of preforms, and/or and a different number of preforms in each group than depicted.

FIG. 8 depicts preform charge 800 having two groups of preforms 820 and 822, wherein the two groups of preforms align with different axes, and have different lengths. In the illustrative embodiment, the axes with which the preforms align are orthogonal to one another. This type of preform charge is particularly useful for plunger-type molds, as disclosed in applicant's co-pending US application entitled "Method for Compression Molding Using Transverse Out-Of-Plane Plunger,". For example, relatively shorter preforms, such as preforms 822, can flow first into the mold to fill smaller features, and relatively longer fiber bundles, such as preforms 820, flow last into the mold to fill large features and connect the smaller features to the larger structure.

FIG. 9 depicts preform charge 900 with preforms 920 and insert 924. In some embodiments, the insert is removable at an appropriate time during the molding process to create an axially aligned through-hole (diamond-shaped in this embodiment) in preform charge 900. In some other embodiments, insert 924 is intended to be non-removable such that it is to be an integral component, such as a sensor, bus, threaded insert, etc., of the final part.

In preform charge 900, insert 924 protrudes beyond the ends of preforms 920. The protruding ends of insert 924 can be used, for example, to register preform charge 900 with features of a mold cavity into which the preform charge is to be placed. In this embodiment, insert 924 is depicted as extending the full length of preform charge 900. In some other embodiments, however, an insert extends only part of the way into the preform charge. In yet some additional embodiments, the insert is completely embedded in the preform charge. Although insert 924 is depicted as being "diamond-shape," the insert can be of any shape.

Figure 10:
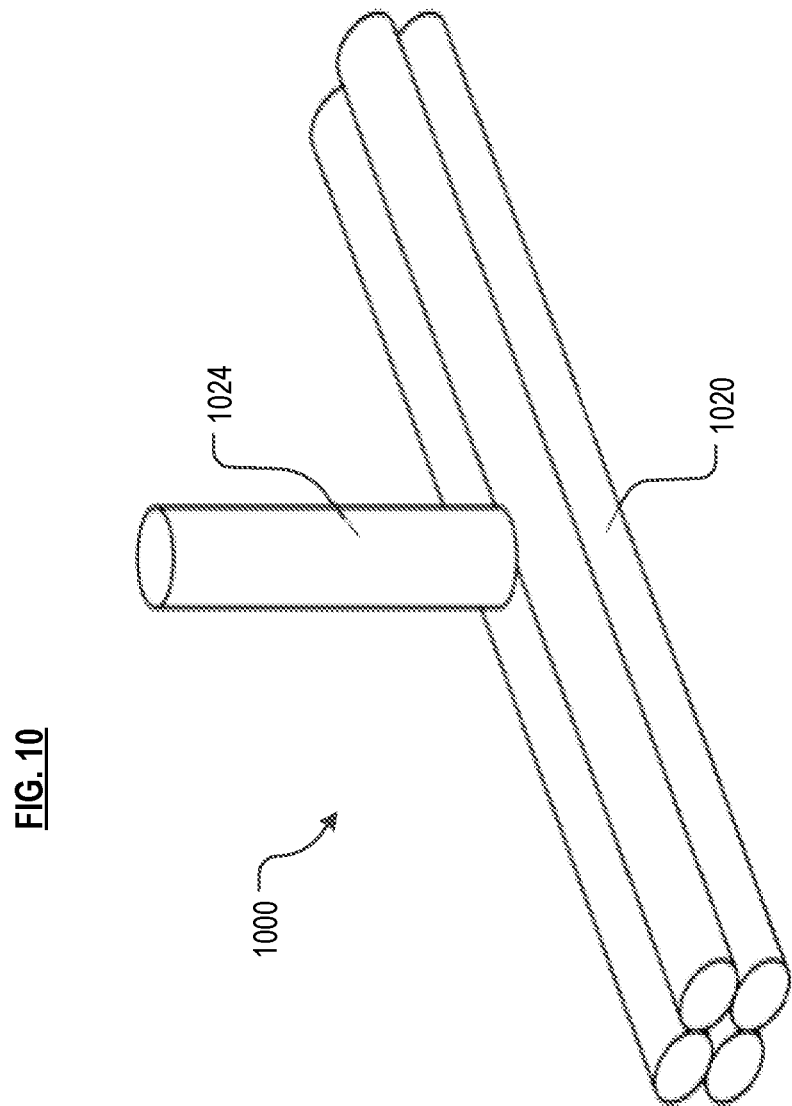
FIG. 10 depicts an embodiment of a preform charge, wherein one bundle functions as a stem, being orthogonal and out-of-plane to other fiber bundles.

FIG. 10 depicts preform charge 1000 having stem 1024. The stem can be another preform of material identical to that of preforms 1020, or it can be resin material only, or a separable part. The stem can be used, for example, to facilitate grabbing a preform charge from the fixture in which it is formed, such as by using a pick-and-place robot. The robot then transfers the preform charge to a mold or, alternatively, to an intermediate holding tray. Stem 1024 is particularly useful for placing preform charges in deep mold cavities. In some embodiments, the stem is part of the preform charge and becomes part of the final part after compression molding. In some other embodiments, stem 1024 is separable and is removed by the pick-and-place robot.

Figure 11:
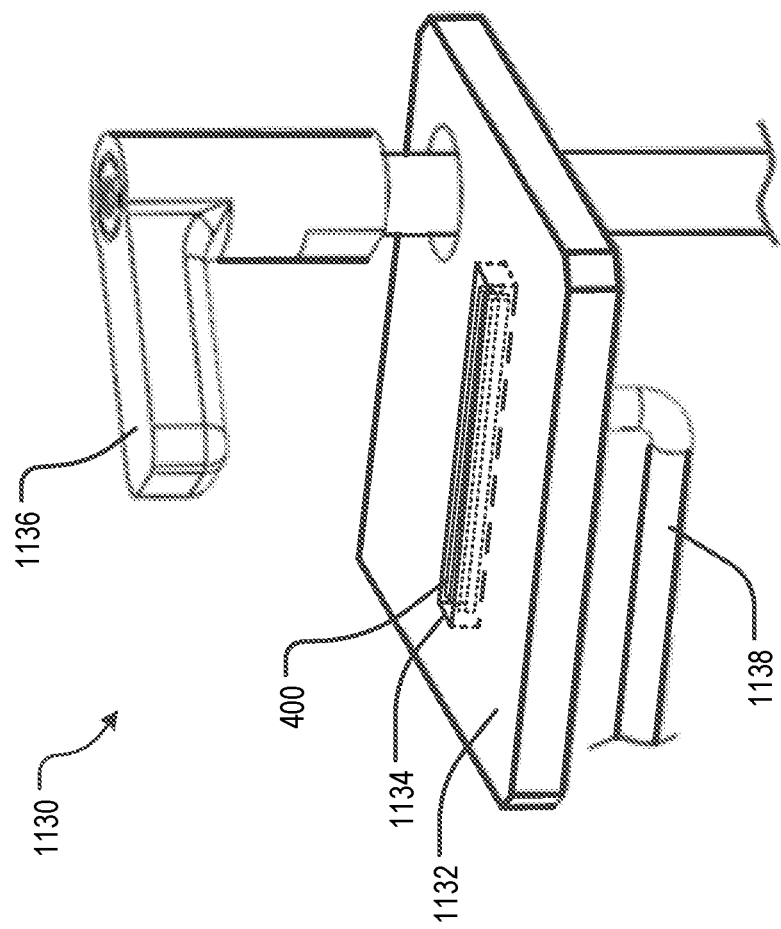
FIG. 11 depicts an embodiment of a preform-charge fixture suitable for forming preform charges of the type depicted in FIGS. 4-10, wherein the preforms composing the preform charge are be arranged in a cavity.

FIG. 11 depicts preform-charge fixture 1130 suitable for forming preform charges of the type depicted in FIGS. 4-10. Preform-charge fixture 1130 includes plate 1132, cavity 1134, clamp 1136, heat/energy source 1138, interrelated as shown.

In preform-charge fixture 1130, cavity 1134 is formed in plate 1132. The cavity has a simple rectangular geometry, enabling it to be used with a variety of different preform-charges. In the illustrative embodiment, cavity 1134 is being used to create preform 400 depicted in FIG. 4. After all preforms situated in cavity 1134, clamp 1136 drops downward to plate 1132 to apply pressure to the preforms. Heat source 1138, which in this embodiment is a tube that conducts hot air into cavity 1134, is used to soften the preforms so that they can tacked together.

In preform-charge fixture 1130, the function of the cavity (i.e., cavity 1134) is organize the preforms into the orientation/geometry required for creating a desired preform charge. In some other embodiments, that functionality is provided by a plurality of "cleats" and clamps. The arrangement of the cleats is dictated by the geometry of preform charge. Preforms are positioned, either robotically or by hand, against the cleats. The clamps restrain the preforms against the cleats. As with preform-charge fixture 1130, after the preforms are immobilized, they are heated (if the polymer resin is a thermoplastic).

FIG. 12 depicts multi-axial preform charge 1200, wherein two preforms 1220 of identical length cross each other orthogonally. Multi-axial preform charges can consist of any number of preforms, they can cross each other at any angle, and they can cross at any location along the length of the preforms. A multi-axial preform charge, such as preform charge 1200, is useful for creating parts with intersections.

FIG. 13 depicts preform-charge fixture 1330 suitable for forming preform charge 1200 of FIG. 12. Preform-charge fixture 1130 includes the same elements as preform-charge fixture 1130. The only difference is the geometry of cavity 1334 as compared to cavity 1134 of preform-charge fixture 1130.

In preform-charge fixture 1330, cavity 1334 formed in plate 1332 has two cavity portions that cross one another orthogonally and at the midpoint of each cavity portion. Cavity 1334 receives appropriately sized preforms, two of which are depicted positioned over the cavity. After the requisite amount of preforms are added to cavity 1334, clamp 1336 drops downwardly to plate 1332 to apply pressure to the preforms. Heat source 1338, which in this embodiment is a tube that conducts hot air into cavity 1334, is used to soften the preforms for tacking.

Figure 14:
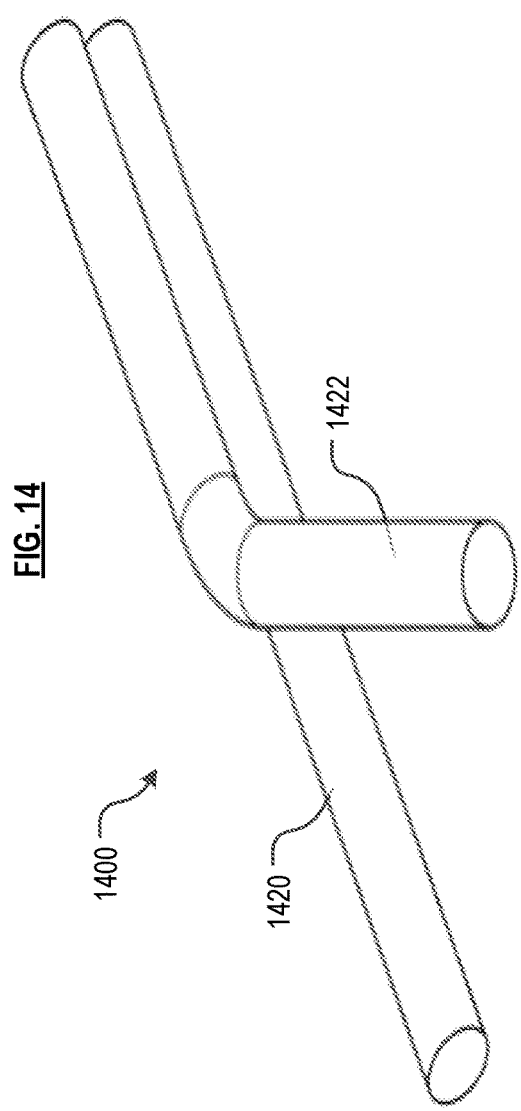
FIG. 14 depicts an embodiment of a preform charge, wherein a fiber bundle is bent.

FIG. 14 depicts preform charge 1400 with having one straight preform 1420 and one bent preform 1422. Preform charges including bent preforms are used to accommodate specific part patterns and fiber orientations in molds. Bent preforms can be very complex, consisting of several bends in 2D or 3D space. Bent preforms can also function as a registration feature for a preform charge, the one or more bent preforms being used to orient the preform charge within a mold wherein only one such preform charge orientation is possible.

Figure 15:
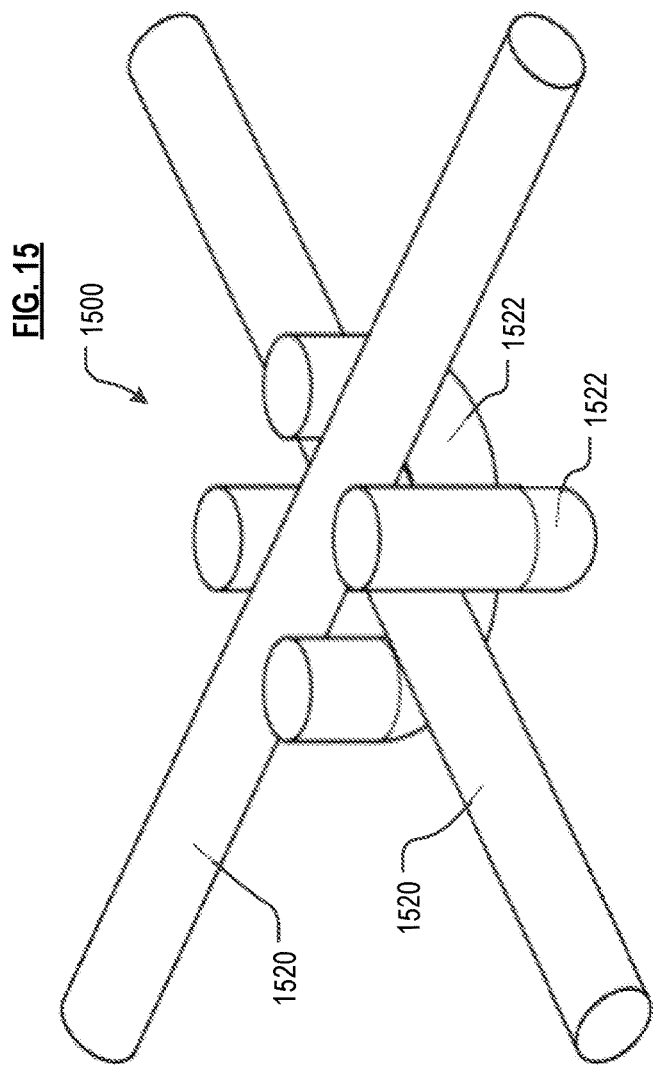
FIG. 15 depicts an embodiment of a preform charge, wherein straight fiber bundles having different orientations are reinforced by curved fiber bundles.

FIG. 15 depicts preform charge 1500 having a multi-axial configuration like preform charge 1200, but also having a reinforced intersection point by virtue of two "u" shaped tows 1522. Such reinforcement improves the properties of the part at the point of intersection of preforms 1520. In some other embodiments, a single "u" shape preform is used for reinforcement, as a function of desired part performance and the part's loading scenario.

Figure 16:
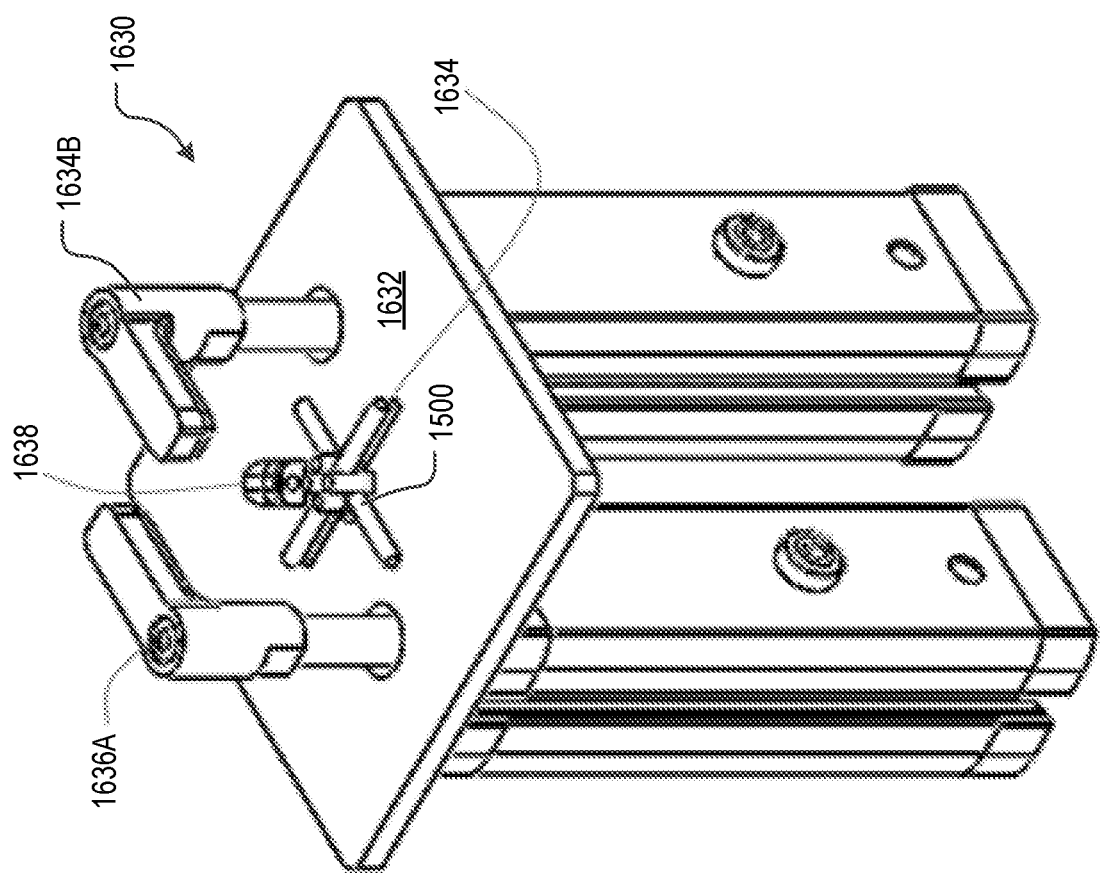
FIG. 16 depicts an embodiment of a preform-charge fixture suitable for forming the preform charge of FIG. 15.

FIG. 16 depicts preform-charge fixture 1630 suitable for forming preform charge 1500 of FIG. 15. Preform-charge fixture 1630 includes plate 1632, cavity 1634, clamps 1636A and 1636B, and heat/energy source 1638, interrelated as shown.

In preform-charge fixture 1630, cavity 1634 formed in plate 1632 has a geometry suitable for accommodating the preforms the compose preform charge 1500. Preform-charge fixture 1630 includes two clamps, wherein to ensure that the relatively more complicated arrangement of preforms are appropriately constrained prior for tacking. In this embodiments, heat/energy source 1638 for softening (thermoplastic resin) is a laser.

FIG. 17 depicts preform charge 1700. In this preform charge, preform 1722 partially wraps around straight preform 1720. This type of preform charge is used, for example, to increase strength in specific directions within parts.

FIG. 18 depicts preform-charge fixture 1830 suitable for forming preform charge 1700 of FIG. 17. Preform-charge fixture 1830 includes the same elements as preform-charge fixture 1630. The only difference is the geometry of cavity 1834 as compared to cavity 1634 of preform-charge fixture 1630.

To form preform charge 1700, straight preform 1720 is placed in the appropriate segment of cavity 1834, followed by bent preform 1722. Multiple instances of either or both such preforms may, of course, be added to cavity 1834, as appropriate.

Figure 19:
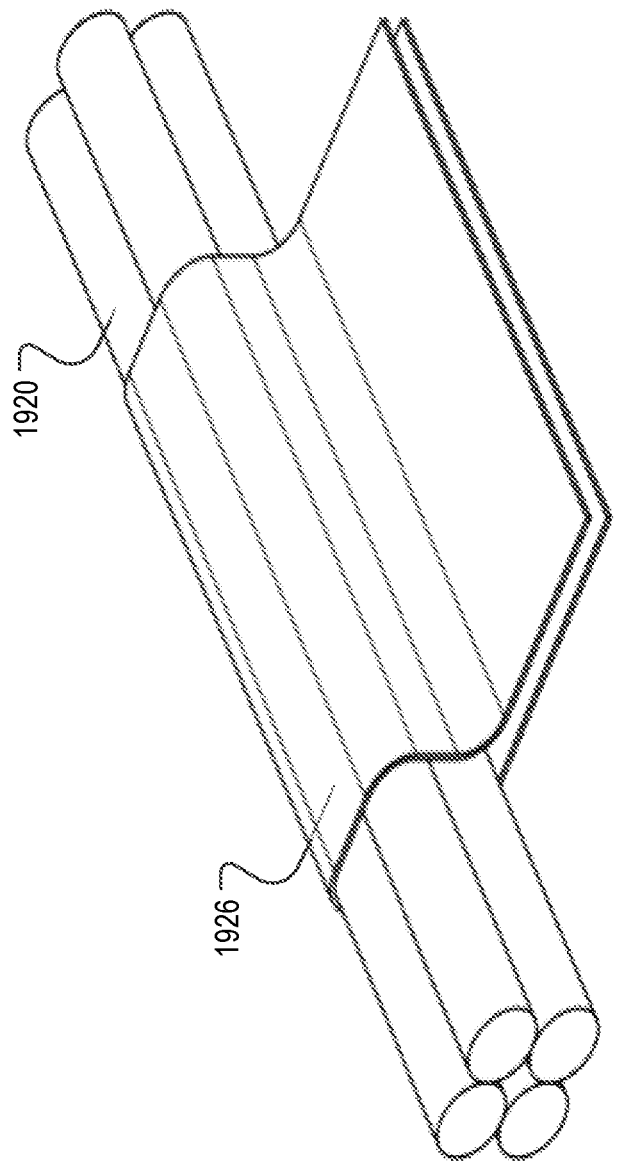
FIG. 19 depicts an eleventh embodiment of a preform charge, wherein reinforcing tape is used to help bind the fiber bundles.

FIG. 19 depicts preform charge 1900, wherein reinforcing tape 1926 assists in binding preforms 1920. In preform charge 1900, the tape is partially wrapped around preforms 1920. In some other embodiments, the tape fully wraps preforms 1920. In yet some further embodiments, tape 1926 is wrapped in a helical pattern around and over the length of preforms 1920. Preform charge 1900 is useful for reinforcing rib-and-sheet structures (see FIG. 20) or adding strength and stiffness in one or both orthogonal directions to the long axes of the preforms 1920.

Figure 20:
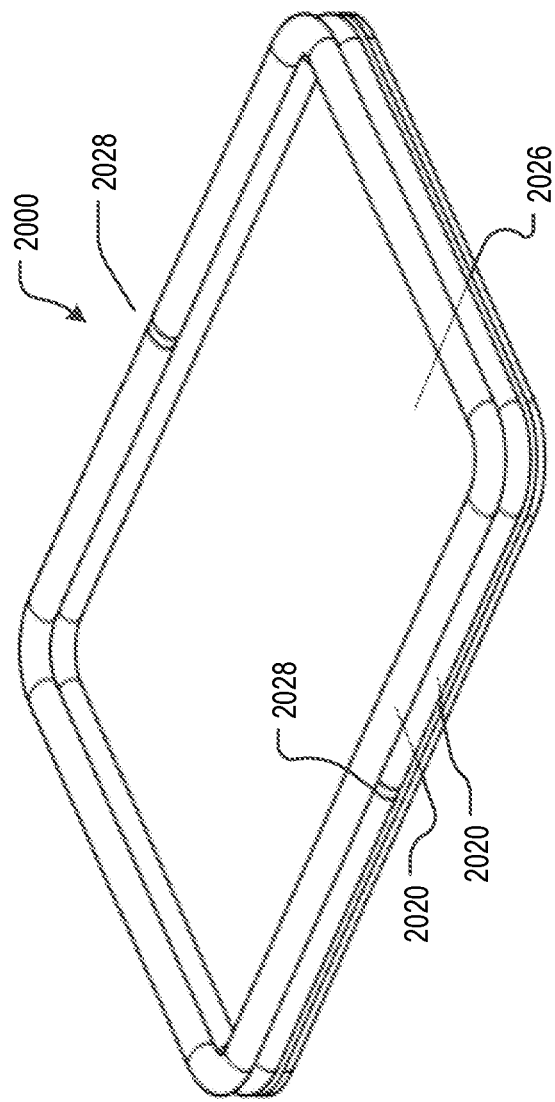
FIG. 20 depicts an embodiment of a preform charge comprising a rib-and-sheet structure, wherein fiber bundles are arranged into a rectangular form at the perimeter of a sheet.

FIG. 20 depicts preform charge 2000 comprising a rib-and-sheet structure, wherein preforms 2020 are arranged into a rectangular form at the perimeter of sheet 2026. In some embodiments, a single preform 2020 is used to form each "rib." In some alternative embodiments, plural preforms 2020 are used to each rib. Gaps 2028 in the preforms 2020 that form each rib depicts the two end points of the preform. The gaps in one rib are offset from those in the adjacent rib. This results in stronger ribs. Sheet 2026 can be made from unidirectional or woven prepreg tape, a laminate of prepreg tape or sheet, chopped towpreg, metal, plastic, or any combination of the foregoing. Ideally, the resin material of the fiber bundles and the sheet is identical or blend-compatible. The sheet is shown as flat but, in other embodiments, could be a more complicated shape.

The preform charges depicted in the various Figures are representative of a number of geometries that are useful in the creation of parts via compression molding. Such preforms charges are presented by way of illustration, not limitation. It is to be understood that there is a practically limitless number of geometries for preform charges, and a nearly limitless number of permutations in terms of the constituent preforms used therein. In light of the present teachings, those skilled in the art will be capable of designing and fabricating preform charges to facilitate the compression molding of any particular part.

Using Preforms and/or Preform Charges in Compression Molding

Figure 21:
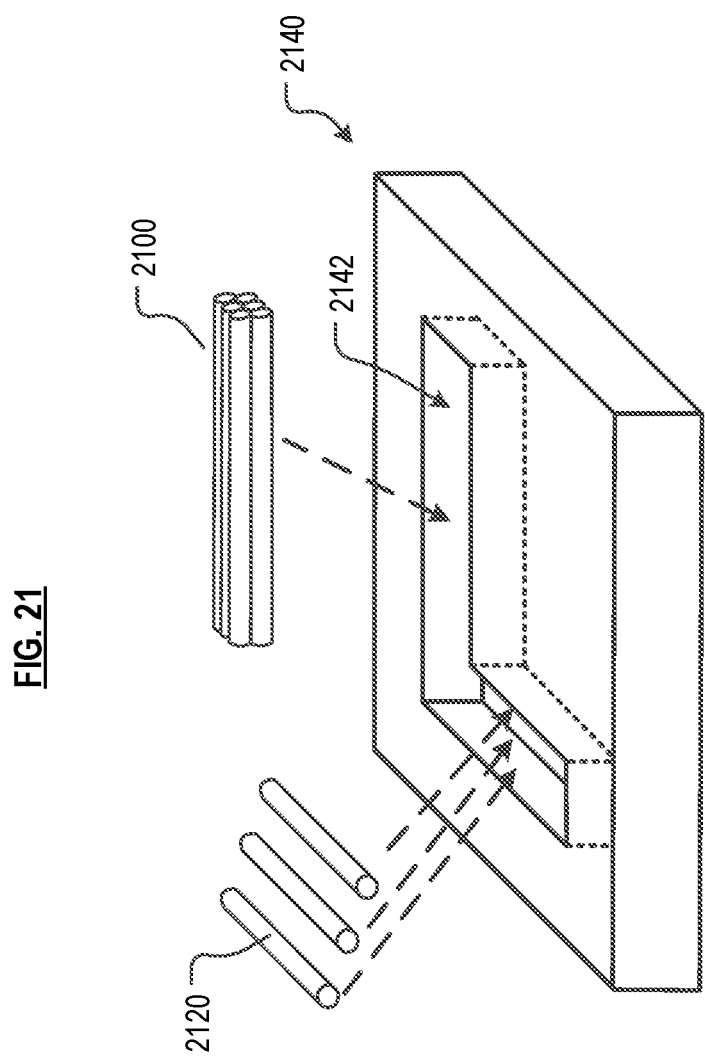
FIG. 21 depicts a female mold for use in a compression molding process, wherein preforms, preform charges, or both are being placed in a mold to fabricated a part in accordance with the present teachings

FIG. 21 depicts female mold 2140 for use in conjunction with a compression-molding process. In some embodiments, female mold 2140 is filled with one or more preform charges, such as preform charge 2100, and then subjected to heat and pressure in accordance with compression-molding protocols, well known in the art. In some other embodiments, female mold 2140 is filled with a plurality of preforms, such as preforms 2120, and then subjected to heat and pressure in accordance with compression molding protocols. And in some yet further embodiments, female mold 2140 is filled with one or more preform charges, such as preform charge 2100, as well as one more more preforms, such as preforms 2120.

The selection of preforms only, versus preform charges only, versus both preforms and preform charges for a given mold is a function of the size and shape of the mold cavity, the presence of small features in the mold cavity, and the location and size of discrete regions requiring a particular fiber alignment, among other considerations.

It is to be understood that the disclosure describes a few embodiments and that many variations of the invention can easily be devised by those skilled in the art after reading this disclosure and that the scope of the present invention is to be determined by the following claims.

What is claimed:

1. A method for forming a fiber composite part, the method comprising:
providing a number, n, wherein n=1 or more, of preform charges, wherein a collective weight of the n preform charges is equal to the weight of the fiber composite part, the n preform charges including a first preform charge, wherein providing the first preform charge comprises printing, via a 3D printer, the first preform charge, the first preform charge having a shape that substantially conforms to at least a first portion of a mold cavity of a compression molding tool into which the first preform charge is to be placed;
placing the number of preform charges in the mold cavity;
closing the mold cavity; and
compression molding the number of preform charges to form the fiber composite part.

2. The method of claim 1 wherein the n preform charges includes a second preform charge, wherein providing the second preform charge comprises printing, via the 3D printer, the second preform charge, the second preform charge having a shape that substantially conforms to at least a second portion of the mold cavity.

3. The method of claim 1 wherein providing the first preform charge comprises adding an insert to the first preform charge.

4. The method of claim 3 wherein the insert is threaded, the method comprising removing the insert from the first preform charge to create a through hole therein.

5. The method of claim 3 wherein the insert comprises an active component selected from the group consisting of mechanical components, electromechanical components, electrical components, optical components, and piezoelectric components.

6. The method of claim 1 comprising performing a non-destructive test method on the number of preform charges prior to placing same in the mold cavity.

7. The method of claim 1 wherein the first preform charge comprises carbon fiber.

8. The method of claim 1 wherein providing the first preform charge comprises machining or laser ablating the first preform charge.

9. The method of claim 1 comprising creating a feature in the number of preform charges to facilitate registration to the mold cavity.

10. The method of claim 2 comprising creating a first feature in the first preform charge and a second feature in the second preform charge to facilitate mating the first and second preform charges to one another.

11. The method of claim 1 wherein the n preform charges includes a second preform charge, wherein providing the second preform charge comprises:
 (a) forming an assemblage of preforms, the assemblage having a first shape, each preform in the assemblage consisting of a fiber bundle and a polymer resin, the fiber bundle including a plurality of co-aligned fibers,
 (b) constraining the preforms in the assemblage to maintain the first shape, and
 (c) after forming the assemblage, softening the preforms, thereby causing at least some neighboring, softened, constrained preforms in the assemblage to tack together, thereby forming the second preform charge.

12. The method of claim 11 wherein each of the preforms is a segment of towpreg.

13. The method of claim 11 wherein each preform in the assemblage has a substantially circular cross section.

14. A method for forming a fiber composite part, the method comprising:
 printing, via a 3D printer, a first preform charge, the first preform charge comprising a single, continuous length of prepreg;
 fabricating a second preform charge by:
 (a) forming an assemblage of a requisite amount of preforms, the assemblage having a first shape, each preform in the assemblage being a segment of towpreg, consisting of a fiber bundle and a polymer resin, the fiber bundle including a plurality of co-aligned fibers,
 (b) constraining the preforms in the assemblage to maintain the first shape, and,
 (c) after forming the assemblage, softening the preforms, thereby causing at least some neighboring softened, constrained preforms in the assemblage to tack together, forming the second preform charge;
 placing the first preform charge and the second preform charge in a mold cavity of a compression-molding tool;
 closing the mold cavity; and
 compression molding the first preform charge and the second preform charge to form the fiber composite part.

15. The method of claim 14 wherein forming an assemblage comprises stacking at least some of the preforms upon one another.

16. The method of claim 15 wherein at least some of the preforms that are stacked are positioned horizontally.

17. The method of claim 14 comprising creating a first feature in the first preform charge and a second feature in the second preform charge to facilitate mating the first and second preform charges to one another in the mold cavity.

18. The method of claim 14 comprising adding an insert to at least one of the first preform charge and the second preform charge.

19. The method of claim 14 wherein the insert comprises an active component selected from the group consisting of mechanical components, electromechanical components, electrical components, optical components, and piezoelectric components.

20. A method for forming a fiber composite part from a feed consisting of one preform charge, the method comprising:
 (a) printing, via a 3D printer, the preform charge;
 (b) placing the preform charge in a mold that produces the fiber composite part via a compression molding process;
 (c) closing the mold; and
 (d) compression molding the preform charge to form the fiber composite part.

21. A method for forming a fiber composite part from a feed consisting of a first preform charge and a second preform charge, the method comprising:
 (a) placing the feed in a mold that produces the fiber composite part via a compression molding process;
 (b) closing the mold; and
 (c) compression molding the feed to form the fiber composite part.

22. The method of claim 21, the method comprising forming the second preform charge by:
 (a) forming an assemblage of preforms, the assemblage having a first shape, each preform in the assemblage consisting of a bundle of fibers and a polymer resin, wherein the fibers in the bundle are co-aligned,
 (b) constraining the preforms in the assemblage to maintain the first shape, and
 (c) after forming the assemblage and constraining the preforms therein, softening the preforms, thereby causing at least some neighboring, softened, constrained preforms in the assemblage to tack together.

23. The method of claim 22, the method comprising printing, via a 3D printer, the first preform charge.

* * * * *